(12) United States Patent
Jung et al.

(10) Patent No.: US 8,100,774 B2
(45) Date of Patent: Jan. 24, 2012

(54) JOINT HAVING A SLIP BUSH

(75) Inventors: Young-sock Jung, Wonju (KR);
Jung-sik Park, Wonju (KR)

(73) Assignee: Mando Corporation, Gyeonggi-Do (KR)

( * ) Notice: Subject to any disclaimer, the term of this patent is extended or adjusted under 35 U.S.C. 154(b) by 454 days.

(21) Appl. No.: 12/291,683

(22) Filed: Nov. 11, 2008

(65) Prior Publication Data

US 2009/0124399 A1 May 14, 2009

(30) Foreign Application Priority Data

Nov. 12, 2007 (KR) .......................... 10-2007-0114812
Oct. 14, 2008 (KR) .......................... 10-2008-0100571

(51) Int. Cl.
*F16D 3/06* (2006.01)
(52) U.S. Cl. ..................................................... 464/162
(58) Field of Classification Search ................... 464/162; 384/29, 37; 280/775
See application file for complete search history.

(56) References Cited

U.S. PATENT DOCUMENTS 6,557,433 B1 * 5/2003 Castellon
2009/0143151 A1 * 6/2009 Jung et al.

FOREIGN PATENT DOCUMENTS

| CN | 1948071 | | 4/2007 | |
|---|---|---|---|---|
| FR | 1.249.781 | * | 11/1960 | ................... 464/162 |
| JP | 1987-041430 | | 2/1987 | |
| JP | 2002-539033 | | 11/2002 | |
| JP | 2007-001531 | | 1/2007 | |
| JP | 2007-106402 | | 4/2007 | |
| JP | 2007-131088 | | 5/2007 | |
| KR | 10-0708876 | | 4/2007 | |

OTHER PUBLICATIONS

Korean Office Action issued in Korean Patent Application No. 10-2008-0100571, mailed Jun. 7, 2010.
Chinese Office Action, with English translation, issued in Chinese Patent Application No. 200810176634.7, mailed Jun. 20, 2010.
Chinese Office Action, with English translation, issued in Chinese Patent Application No. 2008101766347, mailed Feb. 12, 2010.
Japanese Office Action, with English translation, issued in Japanese Patent Application No. 2008-284677, mailed Dec. 14, 2010.

* cited by examiner

*Primary Examiner* — Gregory Binda
(74) *Attorney, Agent, or Firm* — McDermott Will & Emery LLP (57) ABSTRACT

A universal joint includes a tube having a hollow shape; a slip bush inserted into the tube; and a shaft assembled with the tube through the slip bush, wherein the slip bush includes power transmission parts, which are arranged along an circumferential surface of the slip bush in an axial direction and have pins positioned at centers of the power transmission parts and supports supporting both ends of each pin, and elastic parts, which are arranged along the circumferential surface of the slip bush while being spaced from the power transmission parts and have a section with a C-shape, which is formed in such a manner that a side portion is cut out in the axial direction. Therefore, strength and rigidity are improved, even when twist is generated in the universal joint, so that clearance and noise due to abrasion, pressing, etc. can be minimized.

7 Claims, 9 Drawing Sheets

FIG. 1

PRIOR ART

FIG. 2

PRIOR ART

JOINT HAVING A SLIP BUSH

TECHNICAL FIELD

The present disclosure relates to a universal joint, and more particularly to a slip bush of a universal joint, which includes power transmission parts.

BACKGROUND

In a steering apparatus for a vehicle, if a driver rotates a steering wheel in a desired direction, a steering shaft connected to the steering wheel rotates, accordingly. The steering shaft delivers rotational force to a gear box including a rack-pinion gear through a universal joint. At this time, the gear box converts the rotational movement of the steering shaft to a linear movement through the rack-pinion gear so as to transfer it to a rack bar. The rack bar transfers force to a tie rod connected to a knuckle of a tire so as to allow change of the heading direction of a vehicle.

Particularly, a shaft positioned between the steering shaft and the gear-box has a structure where input and output shafts are connected with each other at a predetermined angle, and are not positioned on the same axis. This is because a typical type shaft assembling structure can not transfer power. Therefore, it is necessary to use a universal joint allowing the structure where a steering shaft can be tilted at a predetermined angle.

Figure 1:
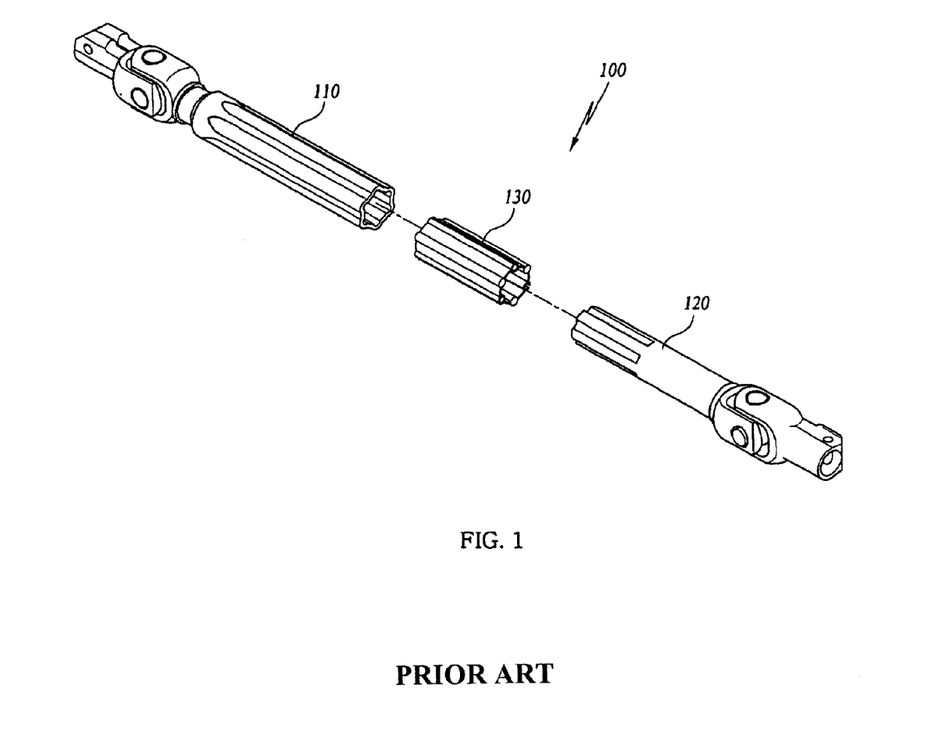
FIG. 1 is an exploded perspective view of a universal joint.
Figure 2:
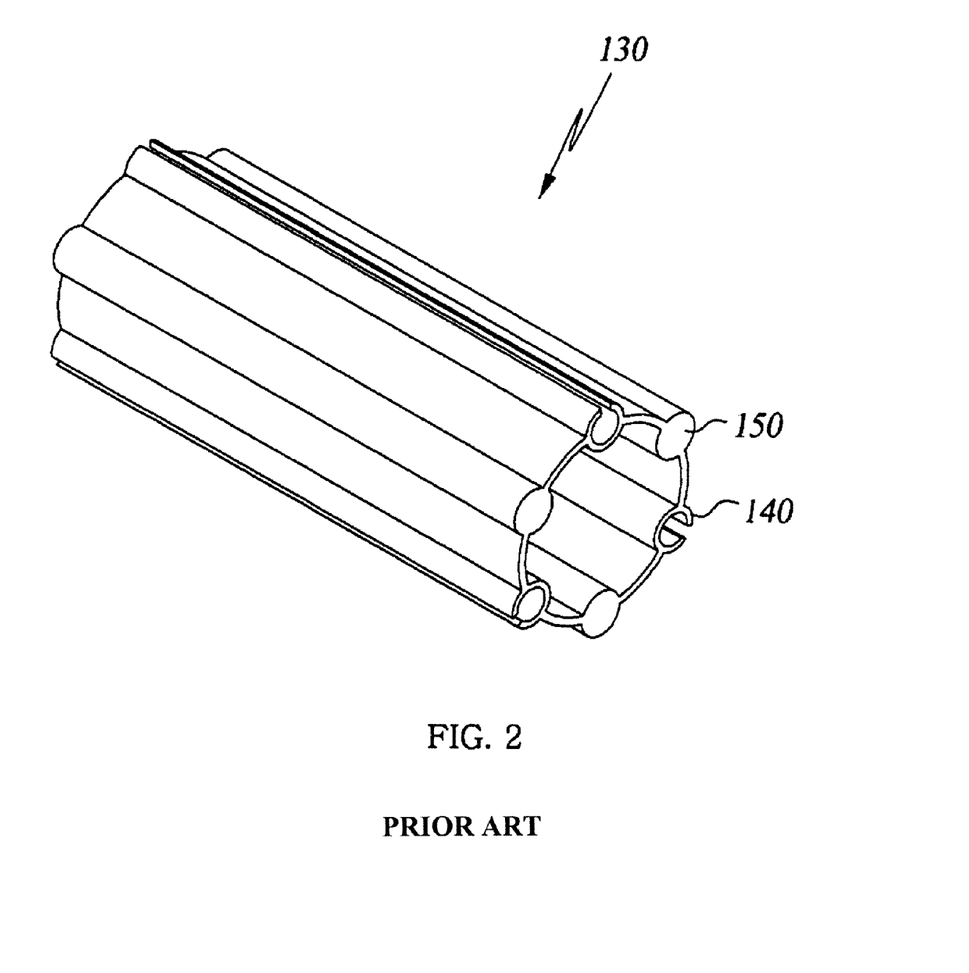
FIG. 2 is a perspective view of a slip bush.

FIG. 1 is an exploded perspective view of a conventional universal joint, and FIG. 2 is a perspective view of a conventional slip bush.

As shown, the universal joint 100, which is connected with a steering shaft so as to deliver rotational movement of a steering wheel to a gear box, includes a tube 110 and a shaft 120. The shaft 120 has a structure which is inserted within the tube 110 by means of the slip bush 130.

The tube 110 has an inner circumferential surface which has been processed into a proper shape so as to allow an elastic part 140 with a C-shaped section and a solid part 150, which are formed along a circumferential surface of the slip bush, to be smoothly guided so that the tube is assembled with the slip bush 130 while making contact with an outer circumferential surface of the slip bush.

Moreover, one side of the shaft 120 has an outer circumferential surface which has been processed into a shape corresponding to the shapes of the elastic part 140 and the solid part 150, so as to be inserted into the slip bush 130. Therefore, the shaft 120 is assembled with the slip bush 130 while making contact with an inner circumferential surface of the slip bush.

As such, in the universal joint 100, at which the slip bush 130 is installed, the assembling structure of the tube 110 and the shaft 120 allows the length of the universal joint to be extended and contracted in an axial direction so as to absorb impact transferred from wheels and improve assembling effectiveness. The assembling structure absorbs kick-back load generated due to impact exerted to the wheels when a vehicle is driven on an uneven road surface, and simultaneously slides in an axial direction when the universal joint is assembled with a steering column and a gear box.

In general, the slip bush 130 is made from plastic material and has a cylindrical shape. Also, the slip bush 130 includes three elastic parts 140 and three solid parts 150, which are formed on circumferential surface of the slip bush 130 by turns while keeping a predetermined interval between each other.

The solid part 150 is shaped like a circular cylinder, in which a half part, which is shaped like a semi-circular cylinder, of the solid part is formed along an outer circumferential surface of the slip bush 130, and the other half part is symmetrically formed along an inner circumferential surface of the slip bush 130.

Also, the elastic part 140 is symmetrically formed along the outer and inner circumferential surfaces of the slip bush 130. The elastic part 140 has a cylindrical shape having a hollow interior, and a predetermined portion of the elastic part, which is formed along the outer circumferential surface of the slip bush 130, is cut out in a longitudinal direction so that the cross-section of the elastic part is shaped like "c".

As such, in the structure of the conventional slip bush 130, when the shaft 120 slides to the interior of the tube 110 in a state where torsional torque or rotational torque is applied, the solid part 150 makes contact with the inner circumferential surface of the tube 110 so as to increase sliding frictional force through frictional force between the solid part 150 and the tube 110. Accordingly, the conventional slip bush 130 has such a structure, which can secure torsional rigidity.

However, in the conventional slip bush 130, the solid part 150 is formed integrally with the slip bush 130. Therefore, when the slip bush 120 slides in a state where rotational torque is applied to the shaft 120, a state where the whole outer circumferential surface of the solid part 150 makes contact with the tube 110 is maintained. As a result, the sliding frictional force increases, and a safety factor respective to torsional rigidity may be reduced.

In the conventional slip bush 130, the solid part 150 of the slip bush 130 receives a large part of load generated in a procedure where the rotational force is transferred between the shaft 120 and the tube 110. Therefore, when strong rotational force is applied to the slip bush during a short period of time, the solid part 150 of the slip bush 130 can be broken since the material of the slip bush 130 is equal to the material of the solid part 150. In this case, it is impossible to perform a steering operation, so that a serious problem regarding safety of a vehicle occurs.

If the conventional slip bush 130 is used, in a case where impact with torsion is exerted on the universal joint 100, sliding frictional force between the solid part 150 of the slip bush 130 and the inner circumferential surface of the tube 110 increases. Therefore, with the solid part 150 being worn away, clearance between the solid part 150 and the tube 110 increases, and in turn, generates unwanted noise.

DISCLOSURE OF INVENTION

Accordingly, the present disclosure provides a slip bush of a universal joint, which includes power transmission parts, which are arranged along a circumferential surface thereof and have each pin inserted into the center thereof, and elastic parts with a C-shaped section, which are formed in such a manner that that they are spaced a predetermined interval from the power transmission parts and are assembled in a compressed state when the slip bush is assembled, so that rigidity and strength of the universal joint are increased even when torsion is generated in the universal joint, thereby minimizing increase of clearance and generation of noise due to abrasion, pressing, etc.

In accordance with an embodiment of the present invention, there is provided a universal joint including: a tube having a hollow shape; a slip bush inserted into the tube; and a shaft assembled with the tube through the slip bush, wherein the slip bush includes power transmission parts, which are arranged along an circumferential surface of the slip bush in an axial direction and have pins positioned at centers of the power transmission parts, respectively, and supports supporting both ends of each pin, and wherein the slip bush includes elastic parts, which are arranged along the circumferential surface of the slip bush while being spaced from the power transmission parts and have a section with a C-shape, which is formed in such a manner that a side portion is cut out in the axial direction.

BRIEF DESCRIPTION OF DRAWINGS

The above and other objects, features and advantages of the present disclosure will be more apparent from the following detailed description taken in conjunction with the accompanying drawings, in which.

DETAILED DESCRIPTION OF THE EMBODIMENTS

Hereinafter, exemplary embodiments of the present invention will be described with reference to the accompanying drawings. In the following description and drawings, the same reference numerals are used to designate the same or similar components, and so repetition of the description on the same or similar components will be omitted. Furthermore, a detailed description of known functions and configurations incorporated herein will be omitted when it may obscure the subject matter of the present invention.

Figure 3:
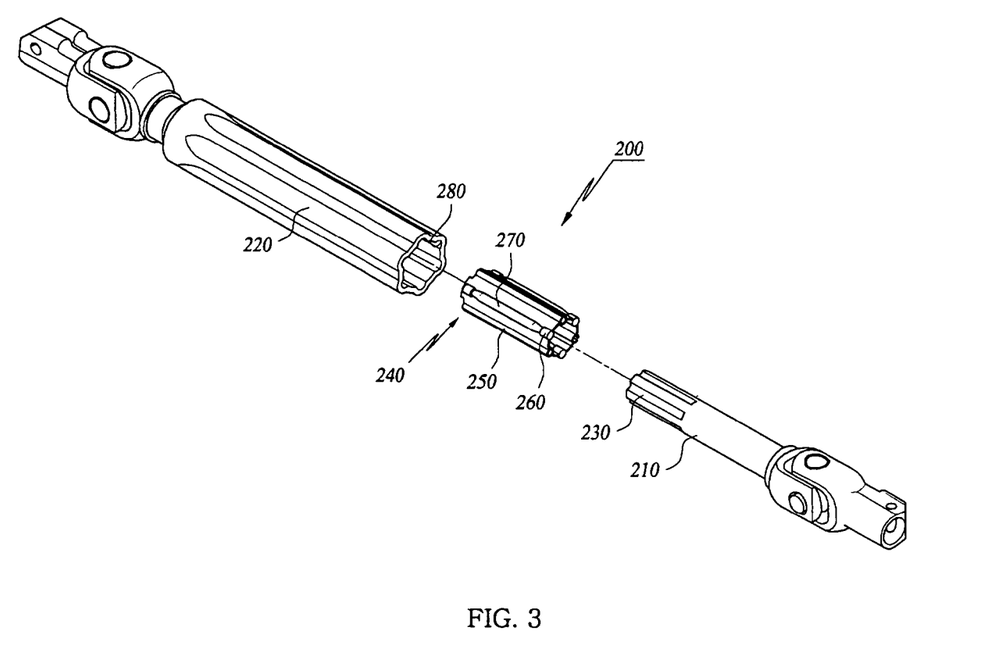
FIG. 3 is an exploded perspective view of a universal joint according to a first embodiment of the present invention.

FIG. 3 is an exploded perspective view of a universal joint according to a first embodiment of the present invention.

The universal joint 200 according to the first embodiment of the present invention includes a shaft 210 inserted into a slip bush 240, and a tube 220 which is hollow and receives the slip bush 240 having the shaft 210 inserted thereinto.

The shaft 210 has one end connected with a steering shaft (not shown) and the other end having first assembling recesses 230 formed along an outer circumferential surface thereof. Herein, it is preferable that at least two first assembling recesses 230 are formed along the outer circumferential surface of the other end of the shaft 210 so as to make contact with elastic parts 250 and power transmission parts formed along a circumferential surface of the slip bush 240. However, the number of first assembling recesses is not limited to two, and can be variously decided according to the number of the elastic parts 250 and the power transmission parts formed on the slip bush 240.

The tube 220 has an inner circumferential surface having a shape corresponding to the shape of the outer circumferential surface of the slip bush 240 so as to allow the shaft 210 having the first assembling recesses 230 formed on the one end thereof and the slip bush 240 assembling with the shaft 210 to be inserted into the tube 220. Particularly, in order to allow the elastic parts 250, the supports 260 of the slip bush 240 and pins 270, which are inserted into the centers of the supports 260 and supported by the supports 260, to be smoothly inserted into the tube 220, the tube 220 has a plurality of second assembling recesses 280 having a shape corresponding to the shape of the outer circumferential surface of the slip bush 240.

Figure 4:
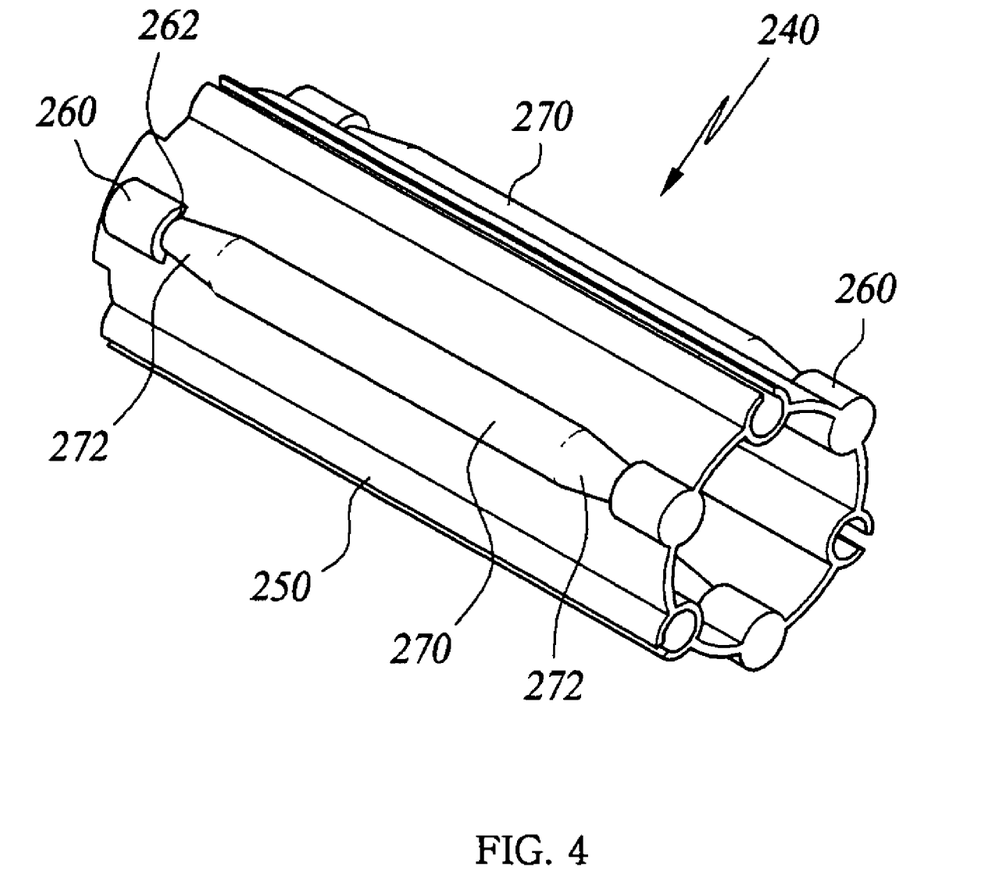
FIG. 4 is a perspective view of a slip bush of a universal joint according to a first embodiment of the present invention.
Figure 5:
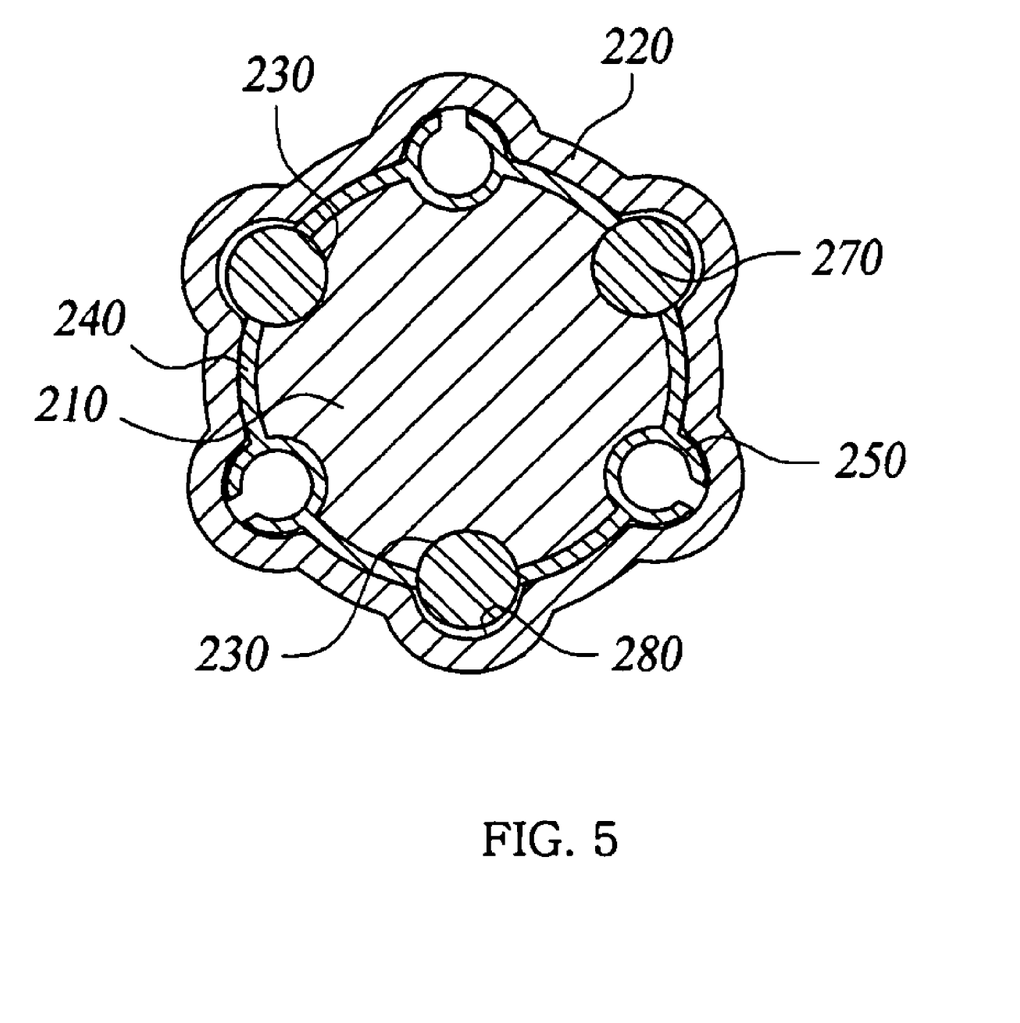
FIG. 5 is a vertically sectional view of a universal joint according to a first embodiment of the present invention.
Figure 6A:
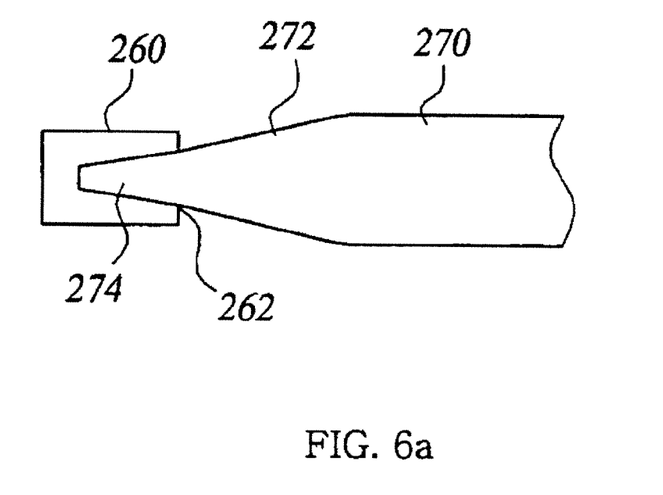
FIGS. 6a and 6b are sectional views of a main part of a power transmission part of a slip bush according to a first embodiment of the present invention, in which a state where a pin is inserted is shown.
Figure 6B:
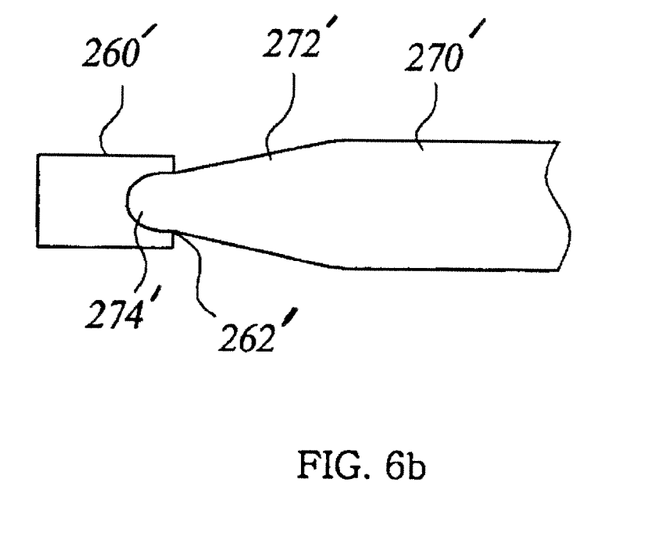

FIG. 4 is a perspective view of the slip bush of the universal joint according to the first embodiment of the present invention, FIG. 5 is a vertically sectional view of the universal joint according to the first embodiment of the present invention, and FIGS. 6a and 6b are sectional views of the main part of the power transmission part of the slip bush according to the first embodiment of the present invention, in which a state where a pin is inserted is shown.

As shown, the slip bush 240 according to the first embodiment of the present invention comes between the shaft 210 and tube 220. The slip bush 240 is made from plastic material so as to provide proper frictional force between the shaft 210 and the tube 220 when the shaft 210 gets retracted into and protracted from the tube 220. Also, the slip bush 240 delivers rotational force generated in the steering wheel (not shown) between the shaft 210 and the tube 220, and absorbs kickback load delivered from wheels while the vehicle is moving, thereby improving steering feel.

The slip bush 240 has a cylindrical shape having a hollow interior. A plurality of elastic parts 250 with a C-shaped section, which are assembled with the tube 220 while being compressed, are formed along the circumferential surface of the slip bush 240 while having a predetermined interval between the elastic parts. Also, the supports 260 are formed between the elastic parts 250 and have a plurality of pins 270 inserted into and supported by the supports. The pins 270 make contact with the inner circumferential surface of the tube 220, i.e. the second assembling recesses 280, when rotational torque is applied to the universal joint 200 so that twist occurs. The length of the slip bush 240 can be varied according to the length of the first assembling recess 230 formed on the shaft 210.

Meanwhile, each elastic part 250 with a C-shaped section is formed in such a manner that a predetermined portion protruding toward the outer circumferential surface of the slip bush 240 is cut out in a longitudinal direction. When the slip bush 240 is inserted into the tube 220, the elastic part 250 is compressed and inserted into the tube. Therefore, the elastic part 250 helps to minimize noise due to an increase in clearance, which is generated when the universal joint 200 is twisted, while the compressed elastic part 250 with a C-shaped section is widened.

Three elastic parts 250 with a C-shaped section may be formed on the circumferential surface of the slip bush 240 in an axial direction, but the number of the elastic parts is not limited to three. Further, there is no problem that at least one elastic part is formed if the elastic part can minimize clearance and noise, which are generated due to twist.

Furthermore, the power transmission parts positioned between the elastic parts 250 with a C-shaped section are repeatedly or sequentially arranged along the circumferential surface of the slip bush 240 together with the elastic part 250. Each power transmission part includes a pin 270 and supports 260 for supporting the pin 270. The supports 260 are formed at both ends of the slip bush 240 and have inserting holes 262, into which both ends of the pin are inserted.

As such, both ends of the pin 270 are inserted into the inserting holes 262 formed at the supports 260, respectively. Therefore, when twist is generated in the universal joint 200, the pin 270 improves strength and rigidity of the universal joint 200 while the outer circumferential surface of the pin 270 makes contact with the inner circumferential surface of the tube 220, i.e. the second assembling recess 280, and the outer circumferential surface of the shaft 210, i.e. the first assembling recess 230.

The both ends of the pin 270 are inserted and fixed into the inserting holes 262 formed at the supports 260. Each fixing part 274 is formed at both ends of the pin 270 so as to allow the pin 270 to be smoothly inserted and fixed into the supports 260. As shown in FIG. 6a, the fixing part 274 is formed by cutting out each portion having a predetermined thickness of both ends of the pin 270 and performing a tapering process thereto so that the fixing part 274 has a proper shape to be inserted into the support 260. Particularly, as shown in FIG. 6b, the fixing part 274'can be made to have a semi-spherical shape having a semi-circular section so as to be inserted into the support 260'.

The inserting hole 262 of the support 260, into which the fixing part 274 of the pin 270 is inserted, has a shape corresponding to the shape of the fixing part 274 so as to allow the fixing part 274 to be effectively inserted into the support 260 and to maximize fixing force between the support 260 and the pin 270.

Each tapered part 272, which has been made into a smoothly tapered shape of a predetermined length, is formed at both ends of the pin 270. Therefore, when the shaft 210 is inserted into the tube 220, it is possible to prevent the first assembling recess 230 formed on one side of the shaft 210 from being worn away by the ends of the pin 270, or to minimize the abrasion of the first assembling recess 230 due to the ends of the pin 270. As a result, generation of clearance between the tube 220 and the shaft 210 is minimized, which in turn reduces noise between the shaft 210 and the tube 220.

Moreover, three pins 270 may be formed in an axial direction of the slip bush 240, similarly to the elastic parts 250, but the number of the pins is not limited to this. Therefore, there is no problem in that at least one pin is formed if the pin can increase strength and rigidity of the universal joint 200.

The outer diameter of the pin 270 is smaller than each inner diameter of the second assembling recess 280 of the tube 220 and the first assembling recess 230 of the shaft 210. Therefore, the pin does not make contact with the second assembling recess 280 of the tube 220 in normal operation. Meanwhile, the pin may make contact with the second assembling recess 280 of the tube 220 when twist is generated in the universal joint 200, thereby improving strength and rigidity of the universal joint 200.

In addition, the pin 270 installed along the circumferential surface of the slip bush 240 may be made from high-carbon steel having an abrasion-proof property, etc., so as to provide predetermined frictional force and strong torsional rigidity when the shaft 210 is inserted into the tube 220 in a state where rotational torque is applied to the universal joint 200. However, the material of the pin is not limited to this. Therefore, the pin can be made from any material if it can provide proper frictional force as well as sufficient strength while making contact with the second assembling recess 280 of the tube 220 and the first assembling recess 230 of the shaft 210.

As such, the slip bush 240 is inserted into the tube 220 in a state where a plurality of elastic parts 250 formed along the circumferential surface of the slip bush 240 are compressed. Therefore, even when twist is generated in the universal joint 200, it is possible to minimize clearance and noise, which are generated due to abrasion and pressure, by elastic force of the compressed elastic parts 250 with a C-shaped section. Also, frictional force may not usually be generated because a fine interval between the pin and the second assembling recess 280 of the tube 220 can be maintained so as to prevent the pin from making contact with the second assembling recess 280. However, when the tube 220 and the shaft 210 are retracted into and protracted from each other while twist is generated in the universal joint 200, the pin 270 installed on the slip bush 240 makes contact with the inner circumferential surface of the tube 220 so as to generate predetermined frictional force, thereby improving strength and rigidity of the universal joint 200.

Figure 7:
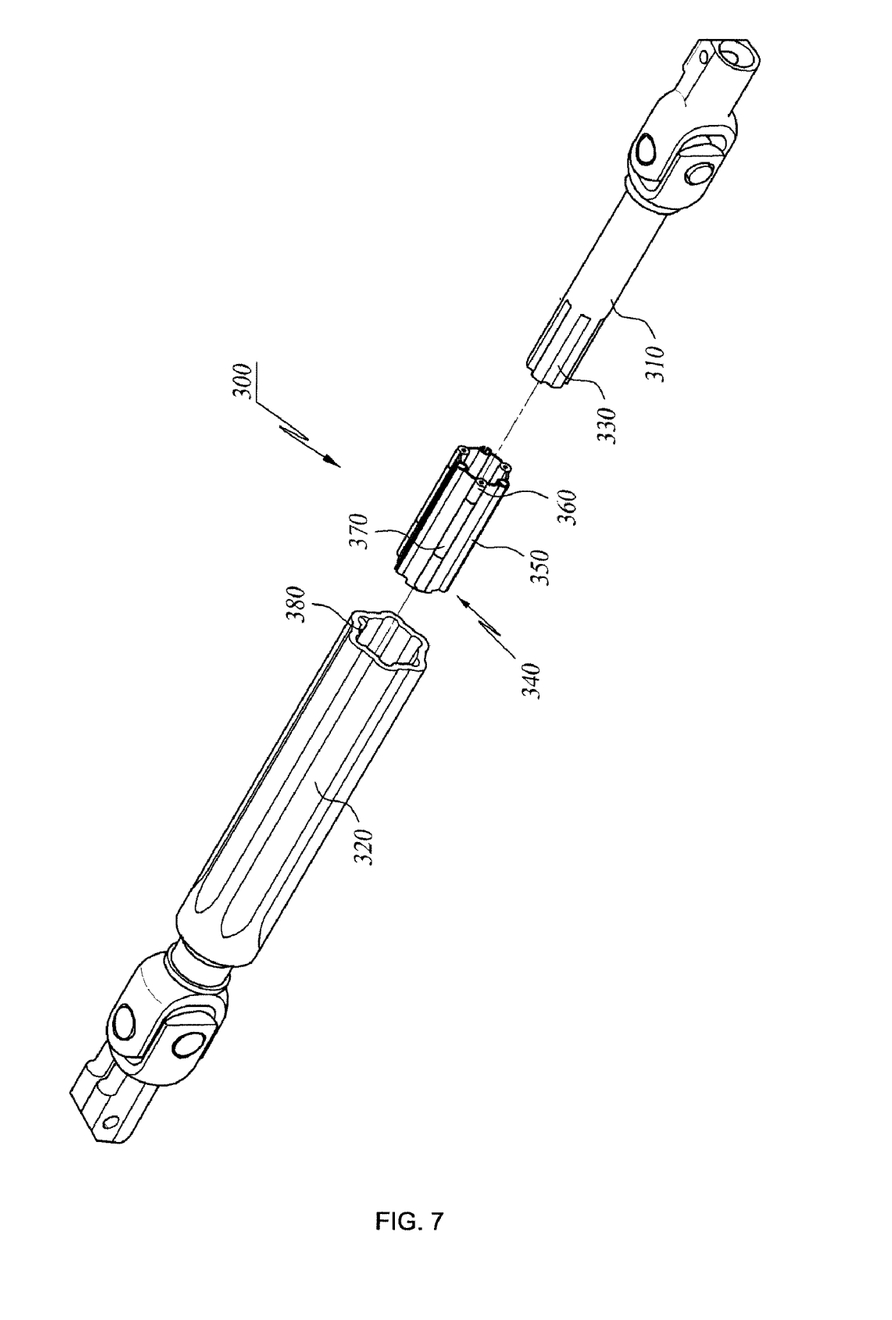
FIG. 7 is an exploded perspective view of a universal joint according to a second embodiment of the present invention.
Figure 8:
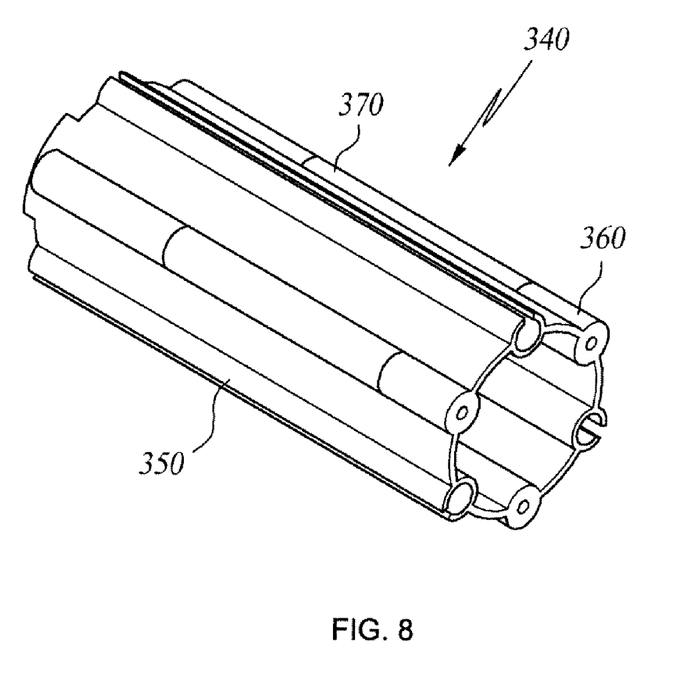
FIG. 8 is a perspective view of a slip bush of a universal joint according to a second embodiment of the present invention.
Figure 9:
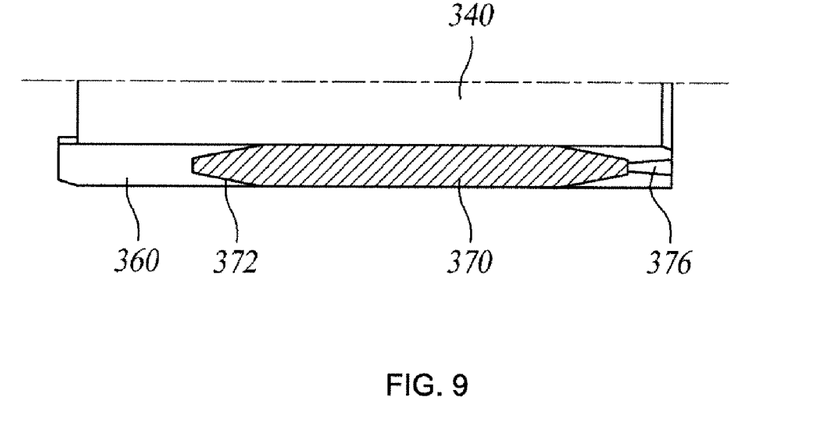
FIG. 9 is a sectional view of a main part of a power transmission part of a slip bush according to a second embodiment of the present invention, in which a state where a pin is inserted is shown.

FIG. 7 is an exploded perspective view of the universal joint according to the second embodiment of the present invention, FIG. 8 is a perspective view of the slip bush of the universal joint according to the second embodiment of the present invention, and FIG. 9 is a sectional view of the main part of the power transmission part of the slip bush according to the second embodiment of the present invention, in which a state where a pin is inserted is shown.

In the second embodiment of the present invention, except for a structure where the pin 370 is installed at the support 360, the remaining structure is similar to the structure of the first embodiment. Hereinafter, the detailed description of components and operations similar to the first embodiment will be omitted.

The slip bush 340 according to the second embodiment of the present invention comes between the shaft 310 and tube 320. The slip bush 340 is made from plastic material so as to provide proper frictional force between the shaft 310 and the tube 320 when the shaft 310 gets retracted into and protracted from the tube 320. Also, the slip bush 340 delivers rotational force generated in the steering wheel (not shown) between the shaft 310 and the tube 320, and absorbs kick-back load delivered from wheels while the vehicle is moving, thereby improving steering feel.

The slip bush 340 has a cylindrical shape having a hollow interior. A plurality of elastic parts 350 with a C-shaped section, which are assembled with the tube 320 while being compressed, are formed along the circumferential surface of the slip bush 340 while having a predetermined interval between the elastic parts. Also, the supports 360 are formed between the elastic parts 350 and have a plurality of pins 370 inserted into and supported by the supports. The pins 370 make contact with the inner circumferential surface of the tube 320, i.e. the second assembling recesses 280 when rotational torque is applied to the universal joint 300 so that twist occurs. The length of the slip bush 340 can be varied according to the length of the first assembling recess 330 formed on the shaft 310.

In a process of making the slip bush 340 from plastic material, the pin 370 is properly arranged within a mold of the slip bush 340 in consideration of the position of a power transmission part and the degree of torsion in a longitudinal direction thereof, and is formed integrally with the slip bush 340 by injecting molding so that the pin is completely fixed in the support 360.

At this time, as shown in FIG. 9, both ends of the pin 370 are accurately processed into a slanted and tapered shape so as to allow plastic resin to smoothly flow in performing injection-molding process and also to prevent the pin 370 inserted into the support 360 from escaping therefrom later. A part indicated with a non-described numeral reference 376 is a track of a core member for fixing a pin, which has been included in the mold and has been used in fixing the pin 370.

Meanwhile, it is preferable that the pin 370 has a diameter a little larger than the diameter of the support 360 in consideration of a tolerance. Also, it is preferable that a predetermined portion of the center of the pin 370 between supports 360 in both sides is exposed toward the outer and inner circumferential surfaces of the slip bush 340 so that the exposed portion of the pin 370 makes close contact with the first assembling recess 330 of the shaft 310 and has a minimized interval from the second assembling recess 380 of the tube 320.

As such, each tapered part 372, which has been processed into a tapered and smooth shape with a predetermined length, is formed at both ends of the pin 370. Therefore, when the shaft 310 is inserted into the tube 320, it is possible to prevent the first assembling recess 330 formed on one side of the shaft 310 from being worn away by the ends of the pin 370, or to minimize the abrasion of the first assembling recess 330 due to the ends of the pin 370. As a result, generation of clearance between the tube 320 and the shaft 310 is minimized so that noise between the shaft 310 and the tube 320 can be reduced.

Moreover, it is preferable that three pins 370 are formed in an axial direction of the slip bush 340, similarly to the elastic parts 350, but the number of the pins is not limited to this. Therefore, there is no problem in that at least one pin is formed if the pin can increase strength and rigidity of the universal joint 300.

The outer diameter of the pin 370 is made smaller than the inner diameter of the second assembling recess 380 of the tube 320, with which the pin will make contact, in a predetermined degree. Therefore, the pin does not make contact with the second assembling recess 380 of the tube 320 in performing a usual operation. Meanwhile, it is preferable that the pin makes contact with the second assembling recess 380 of the tube 320 only when twist is generated in the universal joint 300, thereby improving strength and rigidity of the universal joint 300.

In addition, it is preferable that the pin 370 installed along the circumferential surface of the slip bush 340 is made from high-carbon steel having an abrasion-proof or abrasion-resistant property, etc., so as to provide predetermined frictional force and strong torsional rigidity when the shaft 310 is inserted into the tube 320 in a state where rotational torque is applied to the universal joint 300. However, the material of the pin is not limited to this. Therefore, the pin can be made from any material if it can provide proper frictional force as well as sufficient strength while making contact with the second assembling recess 380 of the tube 320 and the first assembling recess 330 of the shaft 310.

Also, in order to improve sliding smoothness as well as durability, the whole part of the outer or inner circumferential surface of the slip bush 340 can be coated with a lubricant layer. Some materials, such as Teflon may be applied to the whole part thereof. The applied material may get hardened after injection molding is completed.

As such, the slip bush 340 according to the present embodiment is inserted into the tube 320 in a state where a plurality of elastic parts 350 formed along the circumferential surface of the slip bush 340 are compressed. Therefore, even when twist is generated in the universal join 300, clearance and noise can be minimized by elastic force of each compressed elastic part 350 with a C-shaped section. Also, frictional force is not usually generated because a fine interval between the pin and the second assembling recess 380 of the tube 320 is maintained so as to prevent the pin from making contact with the second assembling recess 380. However, when the tube 320 and the shaft 310 are retracted into and protracted from each other while twist is generated in the universal joint 300, the pin 370 installed on the slip bush 340 makes contact with the inner circumferential surface of the tube 320 so as to generate predetermined frictional force, thereby improving strength and rigidity of the universal joint 300.

As described above, the slip bush includes the power transmission parts, which are arranged along an circumferential surface thereof and have each pin inserted into the center thereof, and elastic parts with a C-shaped section, which are formed in such a manner that they are spaced a predetermined interval from the power transmission parts, and are assembled in a compressed state when the slip bush is assembled. Therefore, the present invention improves strength and rigidity, even when torsion is generated in the universal joint, thereby minimizing increase of clearance and generation of noise due to abrasion, pressing, etc.

The embodiments of the present invention has been described for illustrative purposes, those skilled in the art will appreciate that various modifications, additions and substitutions are possible without departing from the scope of the invention. Therefore, exemplary embodiments of the present invention have been described for illustrative purposes and not for limiting purposes so that the scope and spirit of the invention may not be limited by the exemplary embodiments thereof. Accordingly, the scope of the invention is not to be limited by the above embodiments but by the claims and the equivalents thereof.

What is claimed is:

1. A joint having a slip bush comprising:
   a tube having a hollow shape;
   the slip bush inserted into the tube; and
   a shaft assembled with the tube through the slip bush,
   wherein the slip bush includes power transmission parts, the power transmission parts being arranged along an circumferential surface of the slip bush in an axial direction and having a pin positioned at the center of each of the power transmission parts, and two supports supporting both ends of each pin,
   wherein an inserting hole is disposed at the supports positioned at both ends of the slip bush, and a fixing part to be inserted into the inserting hole of each support is disposed at both ends of the pin.

2. The joint having a slip bush as claimed in claim 1, wherein the slip bush includes elastic parts, the elastic parts being arranged along the circumferential surface of the slip bush while being spaced from the power transmission parts and having a section with a C-shape, so that a side portion is cut out in the axial direction.

3. The joint having a slip bush as claimed in claim 1, wherein the number of the power transmission parts having each pin is at least one, and
   the power transmission parts are arranged along the circumferential surface of the slip bush in such a manner that they are spaced from each other.

4. The joint having a slip bush as claimed in claim 1, wherein the number of the elastic parts having a C-shape cross-sectional view is at least one, and the elastic parts are arranged along the circumferential surface of the slip bush in such a manner that they are spaced from each other.

5. The joint having a slip bush as claimed in claim 1, wherein the pin is formed integrally with the slip bush by injection molding and is supported by the supports.

6. The joint having a slip bush as claimed in claim 1, wherein a tapered part is formed at both ends of each pin.

7. The joint having a slip bush as claimed in claim 1, wherein the power transmission parts and elastic parts are arranged alternately with each other along the circumferential surface of the slip bush.

\* \* \* \* \*